(No Model.)
E. A. JONES.
STEP FOR BICYCLES.
No. 519,579. Patented May 8, 1894.
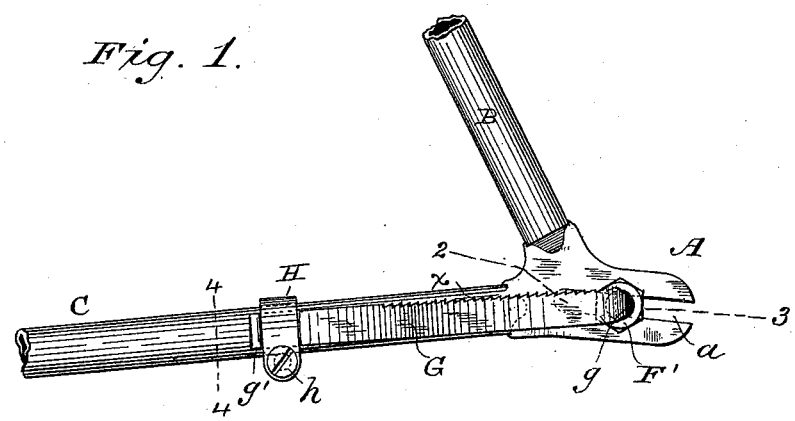
Fig. 1.
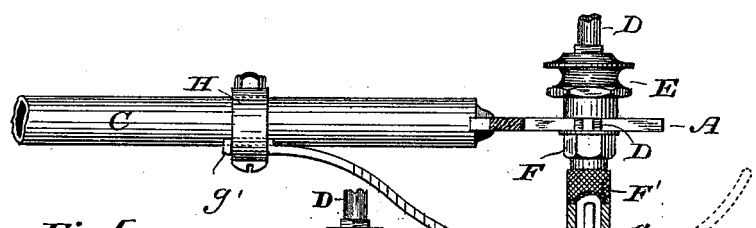
Fig. 2.
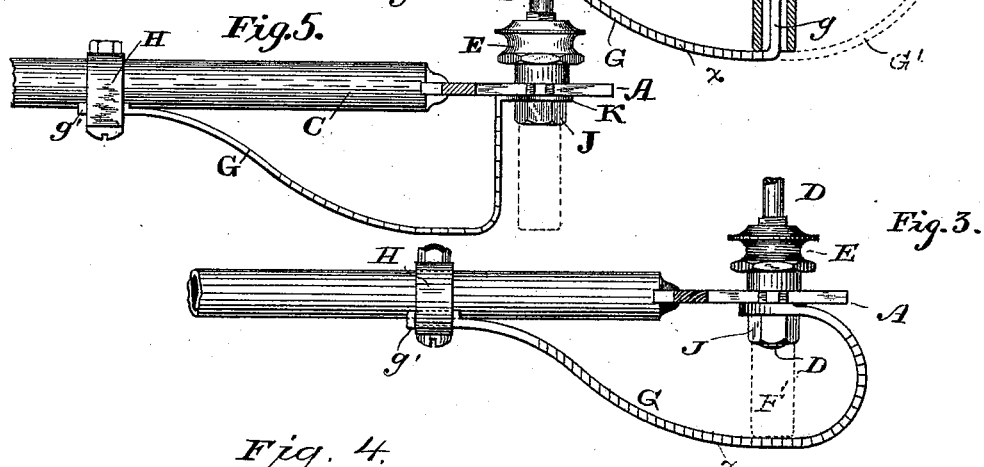
Fig. 5.
Fig. 3.
Fig. 4.
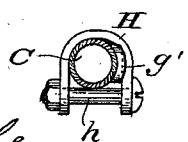
Witnesses
James Wade
Cornelia A. Skinkle
Inventor
Edgar A. Jones
By his Attorney
Wm A. Skinkle
THE NATIONAL LITHOGRAPHING COMPANY,
WASHINGTON, D. C.

UNITED STATES PATENT OFFICE.

EDGAR A. JONES, OF STURGIS, MICHIGAN.

STEP FOR BICYCLES.

SPECIFICATION forming part of Letters Patent No. 519,579, dated May 8, 1894.

Application filed March 9, 1894. Serial No. 502,986. (No model.)

*To all whom it may concern:*

Be it known that I, EDGAR A. JONES, a citizen of the United States, residing at Sturgis, in the county of St. Joseph and State of Michigan, have invented certain new and useful Improvements in Steps for Bicycles, of which the following is a specification, that will enable those skilled in the art to which my invention pertains to make and use the same.
My invention relates to an improved step or stirrup for a safety bicycle.

Its objects are to guard against the danger of false mounts and accidents due to slipping from the diminutive steps at present in common use and to so shape the device that it guards the step from entanglements with passing objects or the limbs of a cyclist which are liable to be struck by the step when walking beside his machine, sometimes tearing the clothing and even injuring the person by the sharp contact.

It consists of a curved strap or band which may constitute the step itself or be so applied to the present step as to form an enlargement thereof while also acting as a guard or deflector therefor.

The accompanying drawings show my invention in the best forms now known to me but changes might be made in the details thereof not shown herein and within the skill of a good mechanic without departing from the spirit of my invention as set forth in the claims at the end of this specification.

Figure 1, is a side elevation of a portion of the rear part of a bicycle frame showing my invention applied thereto. Fig. 2, is a plan view of the same partly in section on the line 2.3. of Fig. 1. Fig. 3, is a view similar to Fig. 2, showing a modification of the invention.
Fig. 4, is a transverse section on the line 4. 4. of Fig. 1. Fig. 5, represents another modification.

In the drawings, the plate A, slotted as at *a*, for chain adjustment purposes as will be well understood by those familiar with the art to which my invention pertains, is rigidly connected to and unites the rear and bottom tubular bars B, and C, of a bicycle frame. The axle D, of the rear wheel of the bicycle passes through the slot *a*, the plate A, being clamped between a cone bearing E, on the inside and a nut F, on the end of the axle outside of the plate.

The mounting step most generally used at present consists of a hollow cylindrical extension F', of this nut, standing out directly from the face of the machine as clearly shown in Fig. 2. This or some form of projecting step held in place by the nut F, is usually made as small as possible in order to prevent entanglement with the limbs of the rider or with passing objects, and it is therefore necessary when mounting, that the foot of the rider should first be placed upon this diminutive step with the utmost care and precision to guard against slipping therefrom with the possibility of injury to the rider and the certainty of a false mount. To overcome these objections by a practical enlargement of the surface of the step, I have applied my device thereto. In Figs. 1, and 2, I show it as constituting an addition to the step now in general use. In this form it consists of a flat bar of metal G, preferably curved to the form shown and having one end *g*, turned at right angle and snugly fitted within the end of the cylindrical step F', while its other end *g'*, is fitted against the side of the frame bar C, and is held in place by the frictional contact of a clamp H. This clamp consists as shown of an open ended yoke embracing the step bar and the frame which are brought into firm contact by a clamping screw *h*, passing through and springing together the lower ends of the yoke. These features of the clamp however, are not essential, for any other suitable device for uniting this end of the step to the frame bar may be employed. In most cases where the hollow step F', is employed the means just described for securing the supplementary step G, will be sufficient, but if desired other additional means may be used. The position and curvature of the step G, shown by the drawings causes it to act as a guard or deflector to ward off passing matters which might otherwise be engaged by the straight out projecting step F'.

As a modification of the forms shown in Figs. 1, and 2, the supplementary step might be extended rearwardly past the projection $g$, and curved inwardly as shown by the dotted lines G', Fig. 2. This would not only increase the area of the step but also serve in some measure to guard it from the limbs of the cycler or from obstacles which might be encountered when the machine is being pushed backward.

In Fig. 3, is shown a form of step which might be used without the hollow step F', (shown by dotted lines) or used in addition thereto if desired. This step is fastened to the frame bar C, by a clamp H, as before described. From this point it extends back curving outwardly as shown until it passes the axis of the rear wheel when it makes a half turn, bending inward and forward until it again crosses the axial line where it is perforated to pass over the end of the shaft D, and be securely clamped against the plate A, by the nut J. This form like that shown in Fig. 2, offers so large a surface to the foot of the rider when mounting his machine that it does not require extreme niceness in locating the foot on the step to prevent accident, and it does not present any abrupt surfaces to be caught against or entangled with passing objects such as bushes, fence posts, or even the limbs of the rider. In any of these forms I prefer to serrate or notch the upper edges of the step as at $x$, to further guard against the foot slipping therefrom.

Fig. 5 represents another modification in which the step is secured at its front end to the frame bar C, by a clamp as before described and has its rear end turned at a right angle toward the frame and terminating in a foot or lug K, perforated to fit over the projecting end of the shaft being clamped against the frame by the nut J.

Having thus described my invention, what I claim as new and useful, and desire to secure by Letters Patent, is—

1. A mounting step for a safety bicycle secured at its forward end to the frame bar of the machine and extending thence curving rearwardly and outwardly to the plane of the rear axle, its rear end being supported in said plane, substantially as hereinbefore set forth.

2. A mounting step for a safety bicycle clamped at one end to the frame bar of a machine and extending thence curving rearwardly and outwardly to the plane of the rear axle where its rear end is supported by a nut screwed upon the axle of the rear wheel, substantially as hereinbefore set forth.

3. The combination of the bicycle frame, the axle for the rear wheel secured therein, the hollow cylindrical mounting step mounted upon the end of said axle, the supplementary step and deflector guard with its sharply bent end $g$, fitting into said hollow step, the guard extending thence forward and inward to a point where it contacts with and is rigidly secured to a frame bar of the bicycle, substantially as hereinbefore set forth.

4. A mounting step for a bicycle consisting of a metal bar secured at its front end to the frame bar and extending thence outwardly and rearwardly, its rear end being re-bent toward the frame of the machine from which it is supported, substantially as hereinbefore set forth.

In testimony whereof I affix my signature, in the presence of two witnesses, at Sturgis, Michigan, February 15, 1894.

EDGAR A. JONES.

Witnesses:
 CHAS. A. STURGIS,
 D. W. KANE.